US012664695B2

(12) United States Patent
Trzyna

(10) Patent No.: US 12,664,695 B2
(45) Date of Patent: Jun. 23, 2026

(54) TEXT AND IMAGE GENERATION FOR CREATION OF IMAGERY FROM AUDIBLE INPUT

(71) Applicant: Microsoft Technology Licensing, LLC, Redmond, WA (US)

(72) Inventor: Alexander Ian Pfister Trzyna, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 18/296,217

(22) Filed: Apr. 5, 2023

(65) Prior Publication Data

US 2024/0338860 A1    Oct. 10, 2024

(51) Int. Cl.
    *G10L 15/26* (2006.01)
    *G06F 40/44* (2020.01)
    *G06T 11/00* (2006.01)

(52) U.S. Cl.
    CPC .............. *G06T 11/00* (2013.01); *G06F 40/44* (2020.01); *G10L 15/26* (2013.01)

(58) Field of Classification Search
    None
    See application file for complete search history.

(56) References Cited

U.S. PATENT DOCUMENTS 10,388,272 B1 * 8/2019 Thomson ................ G10L 15/22
12,045,288 B1 * 7/2024 Barut .................... G06F 16/532

12,182,302 B1 * 12/2024 Haslam ................ H04W 12/33
12,456,469 B1 * 10/2025 Ganguly ................ G10L 25/60
12,518,754 B1 * 1/2026 Sriram .................... G10L 15/22
2012/0053937 A1 * 3/2012 Cao .......................... G10L 15/26
                                                      704/235
2019/0102481 A1 * 4/2019 Sreedhara ............... G10L 15/22
2020/0126565 A1 * 4/2020 Kim ........................ G10L 15/22
2022/0230553 A1 * 7/2022 Tang .................. H04N 21/4756
2023/0072423 A1 * 3/2023 Osborn .................. G16H 20/30
2023/0298566 A1 * 9/2023 Li ........................... G10L 15/16
                                                      704/232
2024/0295953 A1 * 9/2024 Zakharov ................ G06T 11/00
2024/0303431 A1 * 9/2024 Annadi .................... G06F 40/40

OTHER PUBLICATIONS

Zero-Shot Text-to-Image Generation by Ramesh et al. (Published in the International Conference on Machine Learning, Feb. 24, 2021).*

* cited by examiner

*Primary Examiner* — Neeraj Sharma

(57)    ABSTRACT

Systems and methods for using an artificial intelligence (AI) model for providing live image generation based on audio transcription. An image generation system and method convert a live audio stream, such as a conversation, speech, lecture, etc., into a live text transcript using speech-to-text conversion. A segment of the live text transcript is extracted and included in a first language model (LM) prompt. The first LM prompt includes a request for summarization of the transcript segment. The first LM prompt is provided to a large language model (LLM), and a summarization is received in response. A second LM prompt is generated including the summarization and a request for an image of the summarization. The second LM prompt is provided to a text-to-image model, and an image is received in response. The image is displayed on a display screen. Images continue to be generated and displayed as the live audio stream is received.

20 Claims, 7 Drawing Sheets

LARGE LANGUAGE MODEL (LLM) 108

IMAGE-GENERATION ARTIFICIAL INTELLIGENCE (AI) MODEL 118

105

COMPUTING DEVICE 102

APPLICATION(S) 112a-n

IMAGE GENERATOR 110

104

106

MICROPHONE 114

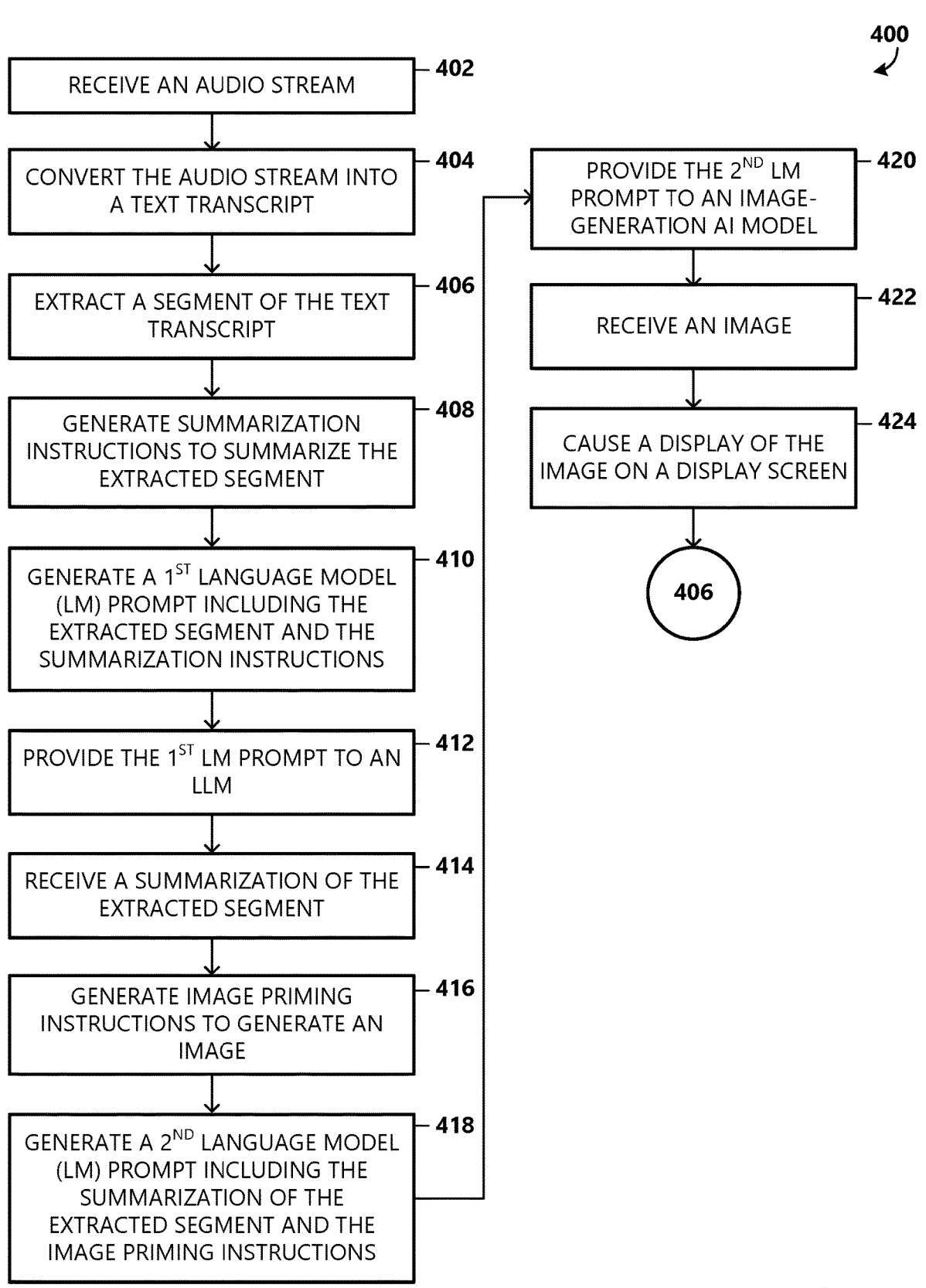

400

402 — RECEIVE AN AUDIO STREAM

404 — CONVERT THE AUDIO STREAM INTO A TEXT TRANSCRIPT

406 — EXTRACT A SEGMENT OF THE TEXT TRANSCRIPT

408 — GENERATE SUMMARIZATION INSTRUCTIONS TO SUMMARIZE THE EXTRACTED SEGMENT

410 — GENERATE A 1$^{ST}$ LANGUAGE MODEL (LM) PROMPT INCLUDING THE EXTRACTED SEGMENT AND THE SUMMARIZATION INSTRUCTIONS

412 — PROVIDE THE 1$^{ST}$ LM PROMPT TO AN LLM

414 — RECEIVE A SUMMARIZATION OF THE EXTRACTED SEGMENT

416 — GENERATE IMAGE PRIMING INSTRUCTIONS TO GENERATE AN IMAGE

418 — GENERATE A 2$^{ND}$ LANGUAGE MODEL (LM) PROMPT INCLUDING THE SUMMARIZATION OF THE EXTRACTED SEGMENT AND THE IMAGE PRIMING INSTRUCTIONS

420 — PROVIDE THE 2$^{ND}$ LM PROMPT TO AN IMAGE-GENERATION AI MODEL

422 — RECEIVE AN IMAGE

424 — CAUSE A DISPLAY OF THE IMAGE ON A DISPLAY SCREEN

TEXT AND IMAGE GENERATION FOR CREATION OF IMAGERY FROM AUDIBLE INPUT

BACKGROUND

Displaying images related to verbally communicated information can enhance the effectiveness of communication by making it more engaging, memorable, and easier to understand. For instance, when images are used to complement verbal communication, they can help to clarify concepts and make them easier to understand, which can be especially beneficial for individuals who learn better through visual aids. In some examples, images can further help individuals to increase recollection of spoken information. For instance, an individual may be more likely to remember information when presented with relevant visuals in comparison to when the information is presented without visuals.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for providing live image generation based on audio transcription. In an example implementation, image generation systems and methods are described that convert a live audio stream, such as a conversation, speech, lecture, etc., into a live text transcript using speech-to-text conversion. A segment of the live text transcript is extracted and included in a first-language model (LM) prompt. The first LM prompt includes a request for summarization of the transcript segment. The first LM prompt is provided to a large language model (LLM), and a summarization is received in response. A second LM prompt is generated including the summarization and a request for an image of the summarization. The second LM prompt is provided to a text-to-image model, and an image is received in response. The image is displayed on a display screen. Images continue to be generated and displayed as the live audio stream is received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 4 is a flow diagram depicting a method of live image generation based on audio transcription according to an example.

DETAILED DESCRIPTION

Examples described in this disclosure relate to systems and methods for generating an image from an audio stream through the use of language models (LM). For instance, a live audio stream, such as from a conversation, speech, meeting, lecture, etc., is received and converted into a live text transcript using speech-to-text conversion. In real time or near-real time, segments of the live text transcript are extracted. When the segment is extracted, it is incorporated into a first prompt for a first language model (LM) that causes the first LM to generate a summarization of the segment. A summarization received from the first LM is included in a second prompt for a text-to-image model that causes the text-to-image model to generate an image representative of the summarization. An image is received and presented on a display screen, which may be positioned in the same room as the microphones that are capturing the live audio stream. Images continue to be generated and displayed as the live audio stream is received.

Displaying images while presenting information can complement and enhance verbal communication. In some examples, the image conveys an emotion or mood, which can enhance the impact of spoken content and provide visual indicators and feedback to the speakers. In further examples, images can provide visual context to spoken content, which, in some examples, can help to clarify the meaning of what is being spoken. In addition, by providing the visual aid to the conversation, those with potential disabilities or neurodivergences are provided with additional assistance in learning or engaging with the spoken content. For instance, the imagery provides a means of communication and information that is easier to understand and process than spoken language alone. Many neurodivergent individuals may have difficulty with verbal communication or processing auditory information, and visual aids can help to bridge this gap. For example, individuals with autism spectrum disorder may benefit from visual aids and these visual aids can help to reduce anxiety and support understanding by providing clear, concrete information in a way that is easier to process. This imagery can be a valuable tool for supporting neurodivergent individuals in a variety of contexts, including education, employment, and everyday life. With the technology disclosed herein, such imagery can be generated in real time based on live context in manner that has never been previously achievable.

Figure 1:
FIG. 1 is a block diagram of a system in which an image generation system is implemented according to an example.
Figure 5:
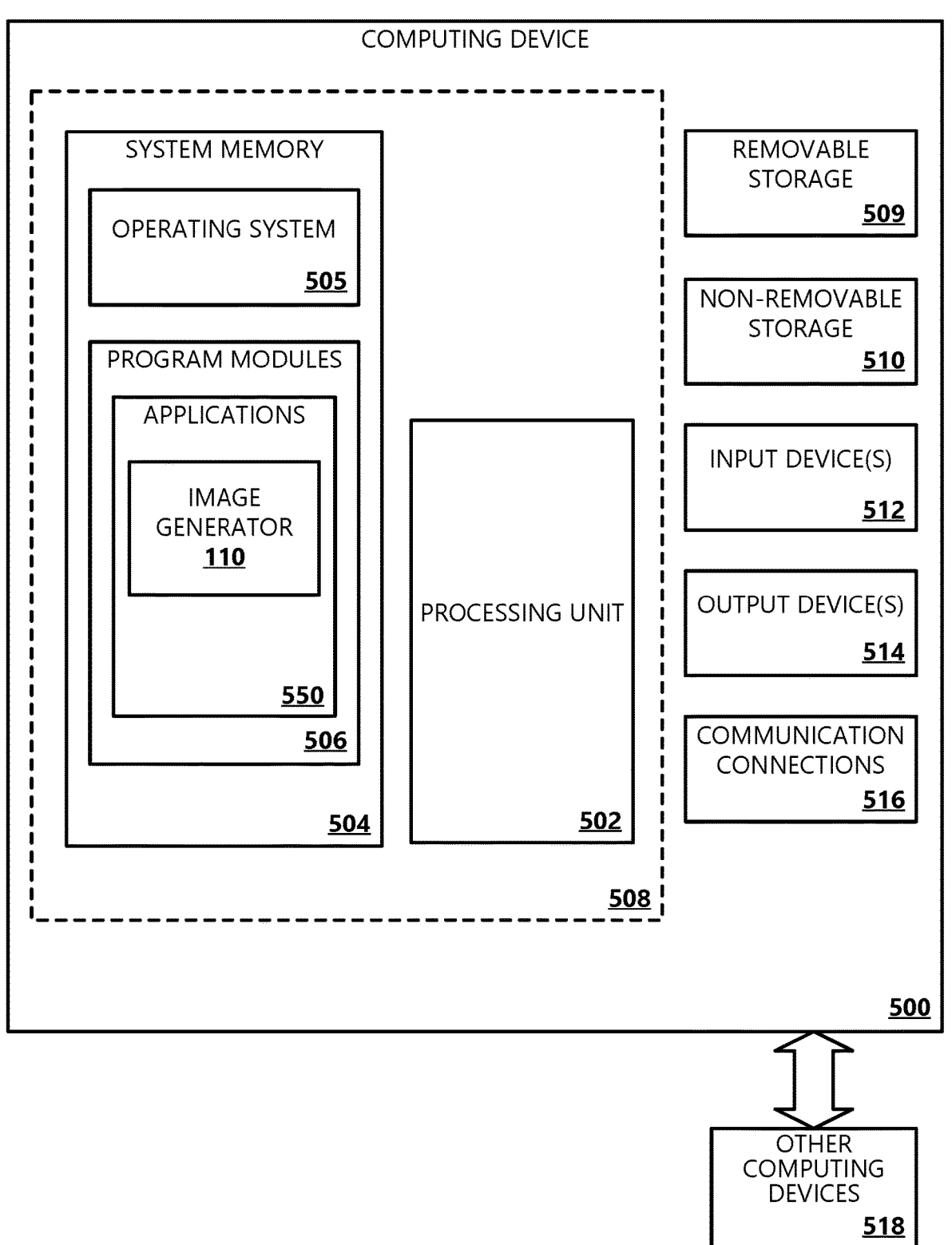
FIG. 5 is a block diagram illustrating example physical components of a computing device with which aspects of the disclosure may be practiced.

FIG. 1 is a block diagram of an example system 100 for providing image generation from an audio stream through the use of LMs in accordance with an example embodiment. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 5. In another example, the components of systems disclosed herein are distributed across multiple processing devices. For instance, input may be entered on a user device or client device and information may be processed on or accessed from other devices in a network, such as one or more remote cloud devices or web server devices.

The example system 100 generates an image from an audio stream using LMs. According to an aspect, the system 100 includes at least one computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture). According to examples, the computing device 102 includes or is in communication with a variety of input devices that receive various types of user inputs (e.g., cursor selections, touch inputs, spoken and other audible inputs, gesture inputs, user focus inputs). According to an example implementation, the input devices include one or more microphones 114 for receiving audible input. In some examples, the audible input includes a live audio stream of spoken, sung, or otherwise uttered words and/or phrases. In some examples, a plurality of microphones 114 are distributed through a room or other environment.

In examples, the computing device 102 includes one or more applications 112 for performing different tasks. For instance, the application(s) 112 may include, but are not limited to, presentation applications, word processing applications, graphics applications, spreadsheet applications, web browsers, image displaying applications, gaming applications, web-based meeting applications, etc. The application(s) 112 may be local applications or web-based applications accessed via a web browser. In some examples, one or more applications 112 are implemented as a Software as a Service (Saas), where the one or more applications 112 are built on cloud resources and are accessible to users of client devices 102 over a network 105 or a network addressable connection (e.g., using a web browser). In further examples, one or more applications 112 are implemented using a microservices architecture, where the application(s) are divided into smaller, independent services that work together to provide the functionality of the application 112. Each application 112 has one or more UIs 106 by which a user can view an image and interact with features provided by the application 112. For example, an application UI 106 may be presented on the display screen 104. In some examples, the display screen 104 is integrated with the computing device 102. In other examples, the display screen 104 is communicatively connected to the computing device 102 but separate from the computing device itself, such as a projector screen or large monitor in a conference room or lecture hall. In some examples, the display screen 104 is in a same room or other environment as one or more microphone(s) 114. In some examples, the operating environment is a multi-application environment by which a user may view and interact with multiple applications 112 through multiple application UIs 106.

According to examples, the system 100 includes an image generator 110 that creates unique art based on a conversation or other audible input received in an environment. In some implementations, the image generator 110 is one of the applications 112. In further implementations, the image generator 110 is included in one or more applications 112. According to an example, the image generator 110 is a separate module that is communicatively integrated into one or more applications 112 via an application programming interface (API). According to an example implementation, the image generator 110 receives audio streams. As will be described in further detail below, the image generator 110 provides functionality for generating a unique image for display on the display screen 104 based on a received audio stream. In some examples, the audio stream is a live audio stream of spoken, uttered, sung, or otherwise verbally communicated audio signals.

In an example implementation, the image generator 110 converts the live audio stream into a live text transcript that is created as the words are being spoken. For instance, the image generator 110 performs speech-to-text to generate the live text transcript in real time or near-real time. In an example implementation, a segment of the live text transcript is extracted, and the image generator 110 generates a first prompt to query a first language model (LM) for a summary of a segment of the live text transcript. In some examples, the first LM prompt includes summarization instructions and the live text transcript segment. According to examples, the image generator 110 provides the first LM prompt to the first LM and receives, in response to the first LM prompt, the summarization of the live text transcript segment. In some examples, the first LM is a large language model (LLM) 108 trained to understand and generate sequences of tokens, which may be in the form of natural language (e.g., human-like text). In various examples, the LLM 108 can understand complex intent, cause and effect, perform language translation, semantic search classification, complex classification, text sentiment, summarization, summarization for an audience, and/or other natural language capabilities.

The image generator 110 further generates a second prompt to query a second LM for generating an image related to the LM generated summarization, referred to herein as a second LM prompt or an image-request LM prompt. In some examples, the second LM prompt includes image-generation priming instructions and the summarization generated by the LLM 108. In an example implementation, the second LM is a text-to-image model, herein referred to as an image-generation AI model 118. For example, the image-generation AI model 118 may be an LM based on a transformer architecture that is trained to generate images based on textual descriptions, such as the DALL-E model from OpenAI. According to an example, the image-generation AI model 118 uses a combination of natural language processing and computer vision to generate images from textual descriptions. For instance, the image-generation AI model 118 is trained on a large dataset of image-caption pairs and can generate a wide range of images based on textual input. Images, for example can include objects, scenes, anthropomorphic creatures, etc.

In some examples, one or both of the LLM 108 and image-generation AI model 118 are in the form a deep neural network that utilizes a transformer architecture to process the text it receives as an input or query. The neural network may include an input layer, multiple hidden layers, and an output layer. The hidden layers typically include attention mechanisms that allow the LLM 108 and/or image-generation AI model 118 to focus on specific parts of the input text, and to generate context-aware outputs. The LLM 108 and/or image-generation AI model 118 are generally trained using supervised learning based on large amounts of annotated text data and learns to predict the next word or the label of a given text sequence. The size of a LM may be measured by the number of parameters it has. For instance, as one example of an LLM 108, the GPT-3 model from OpenAI has billions of parameters. These parameters are the weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The LLM 108 and/or image-generation AI model 118 in examples herein, however, is pre-trained, meaning that the LM has already been trained on the large amount of data. This pre-training allows the model to have a strong understanding of the structure and meaning of text, which makes it more effective for the specific tasks discussed herein.

In example implementations, the LLM 108 and/or image-generation AI model 118 operates on one or more devices located remotely from the computing device 102. For instance, the computing device 102 may communicate with the LM using one or a combination of networks 105 (e.g., a private area network (PAN), a local area network (LAN), a wide area network (WAN)). In some examples, the LLM 108 and/or image-generation AI model 118 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

In an example implementation, the image generator 110 provides the second LM prompt to the image-generation AI model 118 and receives, in response to the second LM prompt, a unique image generated by the image-generation AI model 118.

The image-generation AI model 118 and the LLM 108 are generally both considered to be generative AI models. In some examples, the image-generation AI model 118 and the LLM 108 may be combined into, or replaced by, a single multi-modal generative AI model that is capable of generating and/or processing multiple forms of inputs and outputs, such as text, images, and or audio. In such examples where a multimodal generative AI model is used, the first LM prompt and the second LM prompt may be effectively combined. For instance, a multi-modal prompt may be generated that includes a set of instructions to generate an image based on a summarization of the segment of the text transcript or even a segment of the audio itself. In such examples, the multimodal prompt may be: "Generate an image based on the summary of {SEGMENT}," where {SEGMENT} is replaced by the segment of the text transcript or the segment of the audio file. The multimodal generative AI then generates an image in response to the multimodal prompt.

The image generator 110 further causes the image to be displayed on the display screen 104 to one or more users. Further details of the image generator 110 are described below with reference to FIGS. 2-4.

Figure 2:
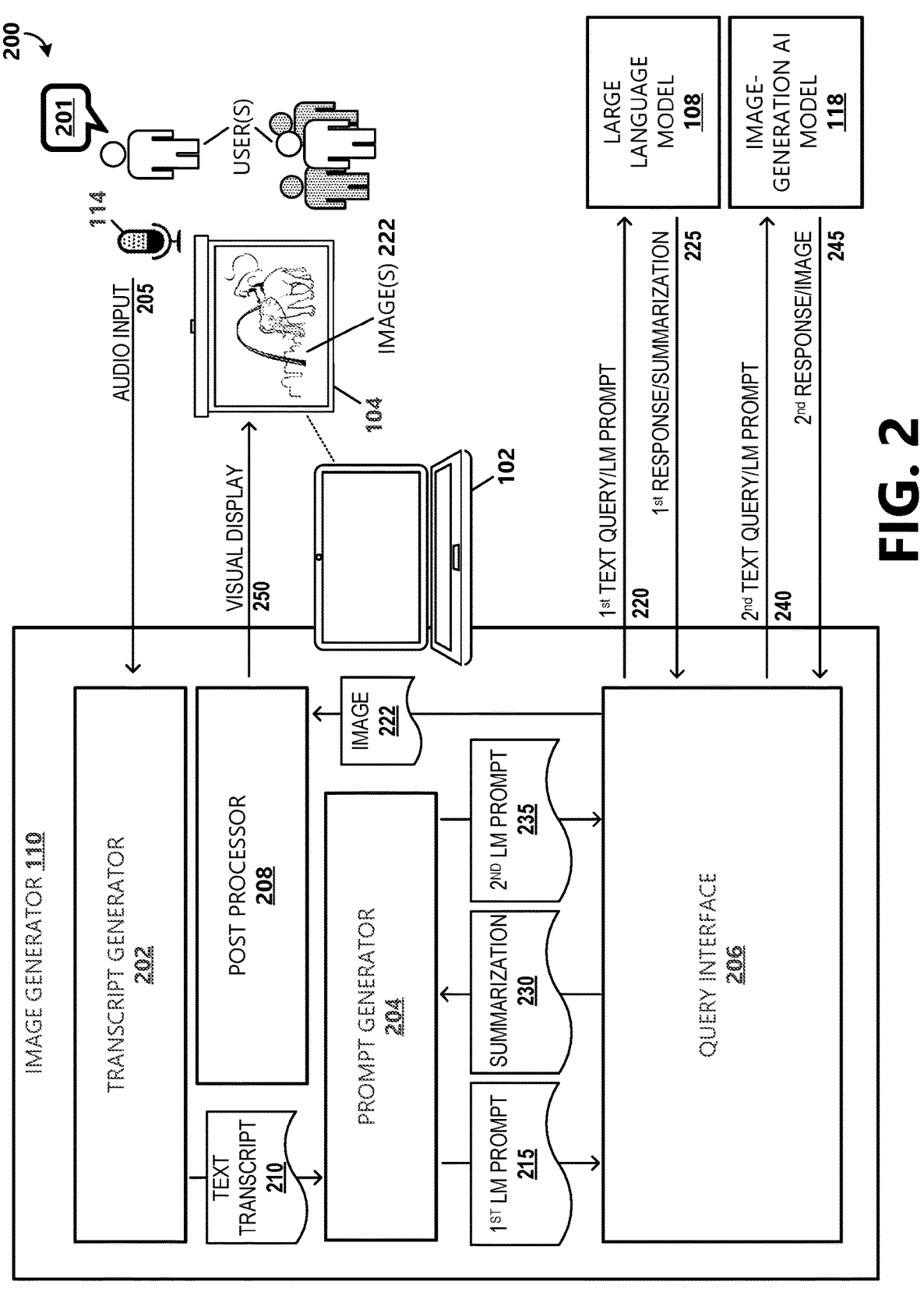
FIG. 2 is a block diagram of components of an example generation system and an example data flow.

With reference now to FIG. 2, example components of the image generator 110 and an example data flow 200 are described according to an embodiment. In some examples, the image generator 110 includes a transcript generator 202, a prompt generator 204, a query interface 206, and a postprocessor 208. Although depicted as separate components, one or more of the transcript generator 202, prompt generator 204, query interface 206, and the postprocessor 208 may be combined and/or divided into further separate components.

According to an example, a user uses the image generator 110 to present images 222 on a display screen 104. For instance, the image generator 110 operates on a computing device 102 to present information on at least one display screen 104 to one or more users. In some examples, the other users are located in a same room/environment as the user. In other examples, one or more other users are communicatively connected to the user's computing device 102 via one or more other computing devices 102. In an example, the users are communicatively connected through a video-supported platform executing on each user's computing device 102 and allowing the users to communicate in real time. According to examples, one or more microphones 114 are located in proximity to at least one of the one or more users. For instance, one or more microphones 114 are positioned to capture audio input 201 (e.g., sound waves associated with verbal communication) corresponding to one or more users and convert the captured audio into electrical signals, which can be transmitted to the image generator 110 for processing. For instance, audio signals of audio input 201 provided by a user are represented in FIG. 2 as data communication 205. In some examples, the audio input 201 is a live audio stream of spoken, sung, or otherwise uttered words and/or phrases provided by one or more users.

According to an example implementation, the audio input 201 is received by the transcript generator 202. For instance, the transcript generator 202 is configured to convert the audio input 201 into a live text transcript 210 using speech-to-text conversion. In some examples, the transcript generator 202 uses automatic speech recognition (ASR) technology that analyzes the audio input 201, breaks the audio input 201 into individual speech sounds, and maps the individual speech sounds onto a sequence of words. In other examples, the transcript generator 202 uses natural language processing (NLP) that analyzes and understands the structure of language, including syntax, semantics, and pragmatics. In further examples, the transcript generator 202 uses machine learning (ML) technology to recognize speech and transcribe it into text included in the live text transcript 210.

According to examples, the prompt generator 204 generates a first prompt intended for a first LM, which is herein referred to as a first LM prompt 215 or a summarization-request LM prompt 215. In an example implementation, the first LM is the LLM 108. In some examples, the prompt generator 204 extracts a segment of the generated text transcript 210 for inclusion in the first LM prompt 215. In some examples, the prompt generator 204 determines the segment based on time (e.g., 10 seconds, 30 seconds, 1 minute). In other examples, the prompt generator 204 determines the segment based on a number of characters, words, or sentences. In an example implementation, a time, character, word, and/or sentence limit for the segment is/are tunable (e.g., user-selectable or automatically determined based on LM speed, a cadence of the received audio/text, or another factor). In other examples, the segment is determined based on other factors.

In some implementations, the prompt generator 204 generates summarization instructions for the first LM prompt 215 corresponding to summarizing the segment of the live text transcript 210. For instance, the summarization instructions may include directives to the LLM 108, such as "summarize the following:". In some examples, the summarization instructions include text length instructions (e.g., "limit the summarization to N words or less", where N is a predetermined number). In some examples, the summarization instructions include element-of-interest instructions corresponding to detecting a particular context or theme of the live text transcript segment and including text corresponding to the context or theme in the summarization 230. For instance, the instructions may cause the first LM to prioritize certain words, attributes, themes, or another feature of the live text transcript segment. In one example, the summarization instructions include instructions to focus on content in the live text transcript segment that can be represented visually through an image. In some examples, the summarization instructions include sentiment instructions corresponding to detecting a mood or sentiment of the live text transcript segment and capturing the mood/sentiment in the summarization 230. The sentiment instructions may also instruct the first LM to include visually descriptive text in the summarization 230.

In some implementations, various guardrails are put into place to ensure responsible and ethical use of using an LM to generate and present an image 222 to users. For instance, a guardrail may be put in place to prevent negative consequences that can arise from displaying certain types of content in certain contexts that may be considered as not responsible, ethical, and/or societal. In some examples, the summarization instructions include guardrail instructions corresponding to allowing and/or disallowing certain types of content in the requested summarization 230. In some examples, the guardrail instructions are based on one or more guardrail settings. For instance, guardrail settings may correspond to selections made by a user or enterprise, privacy protection, security protection, government laws, or other responsible, ethical, and/or societal protocols. As an example, if violence is selected as a type of content to disallow and if language corresponding to violence is detected in the live text transcript segment, an instruction to disallow violent-related information is included in the guardrail instructions, thus causing the summarization 230 to not include the violence-related information. In some examples, guardrail instructions may include a request for the LLM 108 to determine and report whether a speaker or audience of the live text transcript segment is likely a child. For instance, such information can be used to apply further guardrail instructions in a second prompt 235 (e.g., to request an image appropriate for a child audience). In other examples, the summarization instructions include additional and/or alternative instructions.

According to examples, the prompt generator 204 generates the first LM prompt 215 by combining the summarization instructions and the live text transcript segment to request a summarization 230 of a portion (e.g., segment) of the live text transcript 210. A communication of the first LM prompt 215 from the query interface 206 of the image generator 110 to the LLM 108 is represented in FIG. 2 as data communication 220. According to an example, the LLM 108 analyzes the first LM prompt 215 to generate a relevant response including a summarization 230 of the live text transcript segment. In examples, the LLM 108 uses information included in the summarization instructions to understand the intent and context of the live text transcript segment. According to examples, the term "context" is used to describe information that can influence an interpretation and execution of the request to generate a summarization 230. For instance, if the live text transcript segment includes language about a specific topic, the LLM 108 can generate a summarization 230 that includes the topic. As another example, if the live text transcript segment includes emotional language and/or elements that reveal a tone or mood of the audio input 201, the LLM 108 can generate a summarization 230 that includes the emotional language and/or elements. As another example, if the live text transcript segment includes language including a visual description of a subject, the LLM 108 can generate a summarization 230 that includes the visual description. A communication of the summarization 230 to the query interface 206 in a response to the first LM prompt 215 is represented in FIG. 2 as data communication 225.

According to examples, the prompt generator 204 additionally generates a second LM prompt 235 intended for a second LM (e.g., the image-generation AI model 118). In some examples, the prompt generator 204 generates image generation priming instructions for the second LM prompt 235, where the image-generation priming instructions include one or more priming words that describe a specific context, theme, mood, desired image type (e.g., photo, drawing, painting, a stained glass image), etc., that causes the image-generation AI model 118 to generate an image 222 representative of the summarization 230 generated by the first LM and further representative of the one or more priming words. Some example priming words include "beautiful", "sad", "funny", "work-appropriate", "child-appropriate", etc. In an example implementation, the priming word(s) correspond to a sentiment, context, theme, mood, etc., captured by the first LM (e.g., the LLM 108). In another example implementation, the priming word(s) are user selected. For example, the image-generation priming instructions may include instructions such as, "generate a beautiful picture of:", "generate a sad picture of:", "generate a black-and-white line drawing of:", "generate a cartoon drawing of:", etc., followed by the summarization 230 generated by the LLM 108.

In some examples, the image-generation priming instructions for the second prompt include guardrail instructions corresponding to allowing or disallowing certain image content or types of image content. For instance, image-generation priming instructions including guardrail instructions may include language such as, "generate an image appropriate for all audiences of:", "generate a painting without nudity or sexual content of:", "create a cartoon without violence:", etc., followed by the LM-generated summarization 230. In some examples, the guardrail instructions correspond to one or more user selections (e.g., parental control options, restricted content options, filter settings). In other examples, the guardrail instructions correspond to one or more determinations made by the first LM (e.g., the LLM 108). For instance, the LLM 108 may be prompted to and may determine the live text transcript segment includes language indicative of a child user (e.g., a presenter or a person being presented to). In some examples, if a child user is detected, the prompt generator 204 includes guardrail instructions corresponding to generating an image 222 appropriate for the child user in the image-generation priming instructions. Other guardrails and guardrail instructions are possible are within the scope of the present disclosure.

According to examples, the prompt generator 204 generates the second LM prompt 235 by combining the image-generation priming instructions and the summarization 230. A communication of the second LM prompt 235 from the query interface 206 of the image generator 110 to the image-generation AI model 118 is represented in FIG. 2 as data communication 240. According to an example, the image-generation AI model 118 analyzes the second LM prompt 235 to generate a relevant response including an image 222 of the summarization 230. In examples, the image-generation AI model 118 uses information included in the image-generation priming instructions to understand the intent and context of the summarization 230. For instance, if the summarization 230 includes language about a "cute white fluffy poodle" and the image-generation priming instructions include instructions to generate a picture in a sad tone, the image-generation AI model 118 may generate an image 222 of a poodle with a sad expression or with a gloomy background. A communication of the image 222 to the query interface 206 in a response to the second LM prompt 235 is represented as data communication 245.

In some examples, the postprocessor 208 receives the image 222 and causes a visual display of the image 222 on one or more display screens 104 in communication with the computing device 102, which is represented in FIG. 2 as data communication 250. For instance, the displayed image 222 is related to a live audio stream of a conversation, lesson, speech, or other verbal communication and can be used to enhance the effectiveness of verbally communicated information, for example, by making it more engaging, memorable, and easier to understand. According to examples, the image generator 110 continues to receive a live audio stream of audio input 201 captured by the microphone(s) 114. The image generator 110 further continues to use the LMs to generate and display updated images 222 based on text transcript segments as described above. In some examples, the postprocessor 208 further post processes one or more images 222 to transform and/or present the image(s) 222 in a different format. In an example implementation, the postprocessor 208 generates a compilation of previously displayed images 222 and causes the compilation of previously displayed images 222 to be displayed on the display screen 104.

In some implementations, prior to generating the first LM prompt 215 for a live text transcript segment, the image generator 110 determines whether to trigger image generation for the segment. For instance, the image generator 110 triggers image generation for a live text transcript segment based on one or more factors. According to some examples, the image generator 110 extracts a second segment of the live text transcript 210 and evaluates a similarity of a topic of the second segment in comparison with a topic of the first live text transcript segment. For instance, text analysis processes, such as topic modeling and clustering, are performed to represent the live text transcript segments as vectors in a high-dimensional space, where a similarity metric is computed for the segment topics. If the similarity metric is above a similarity threshold, the two topics are determined to be similar. If the similarity metric is below the similarity threshold, a determination is made that the topic of the first live text transcript segment has changed to another topic.

In some examples, the image generator 110 triggers image generation of the second live text transcript segment when the similarity metric is below the similarity threshold. For instance, image generation is triggered when a topic change from a prior topic to a current topic is detected. Thus, a number of calls made to the LMs are reduced, which ultimately reduces consumption of computing resources in both bandwidth utilization and processing resources of the LMs. In some examples, the image generator 110 generates a second summarization-request LM prompt 215 for querying the LLM 108 for a summarization of the second live text transcript segment, generates a second image-request LM prompt 235 for querying the image-generation AI model 118 for an image 222 of the summarization, and provides a second image 222 for display that represents the second topic.

In other implementations, the image generator 110 further includes, in the second summarization-request LM prompt 215, the first live text transcript segment and a request for the LLM 108 to determine whether the topics of the first live text transcript segment and the second live text transcript segment are similar or dissimilar. For instance, if a response from the LLM 108 indicates the topics are dissimilar, the image generator 110 triggers image generation and constructs a second image-generation LM prompt 235 for generating a second image 222.

In another example implementation, the image generator 110 triggers image generation for a live text transcript segment based on speaker similarity. For instance, the image generator 110 extracts a second segment of the live text transcript 210 and evaluates a similarity of the speaker of the second segment in comparison with the speaker of the first live text transcript segment. In some examples, when the speaker of the second segment is determined to be a different speaker than the speaker in the first segment, the image generator 110 triggers image generation and constructs the second image-request LM prompt 235 (i.e., image generation is triggered by a change in speaker). In other examples, when the speaker of the second segment is determined to be the same speaker as in the first segment, the image generator 110 triggers image generation and constructs the second image-generation LM prompt 235 (i.e., image generation is triggered by a continuity in speaker). In other implementations, additional and/or other methods are used to determine whether to trigger image generation.

As discussed above, in some examples, the LLM 108 and the image-generation AI model 118 are combined into a multimodal generative AI model. In such examples, any or all of the features of the summarization-request prompts and the image-request prompts discussed above may be combined into a single summarization-and-image-generation LM prompt.

Figures 3A, 3B:
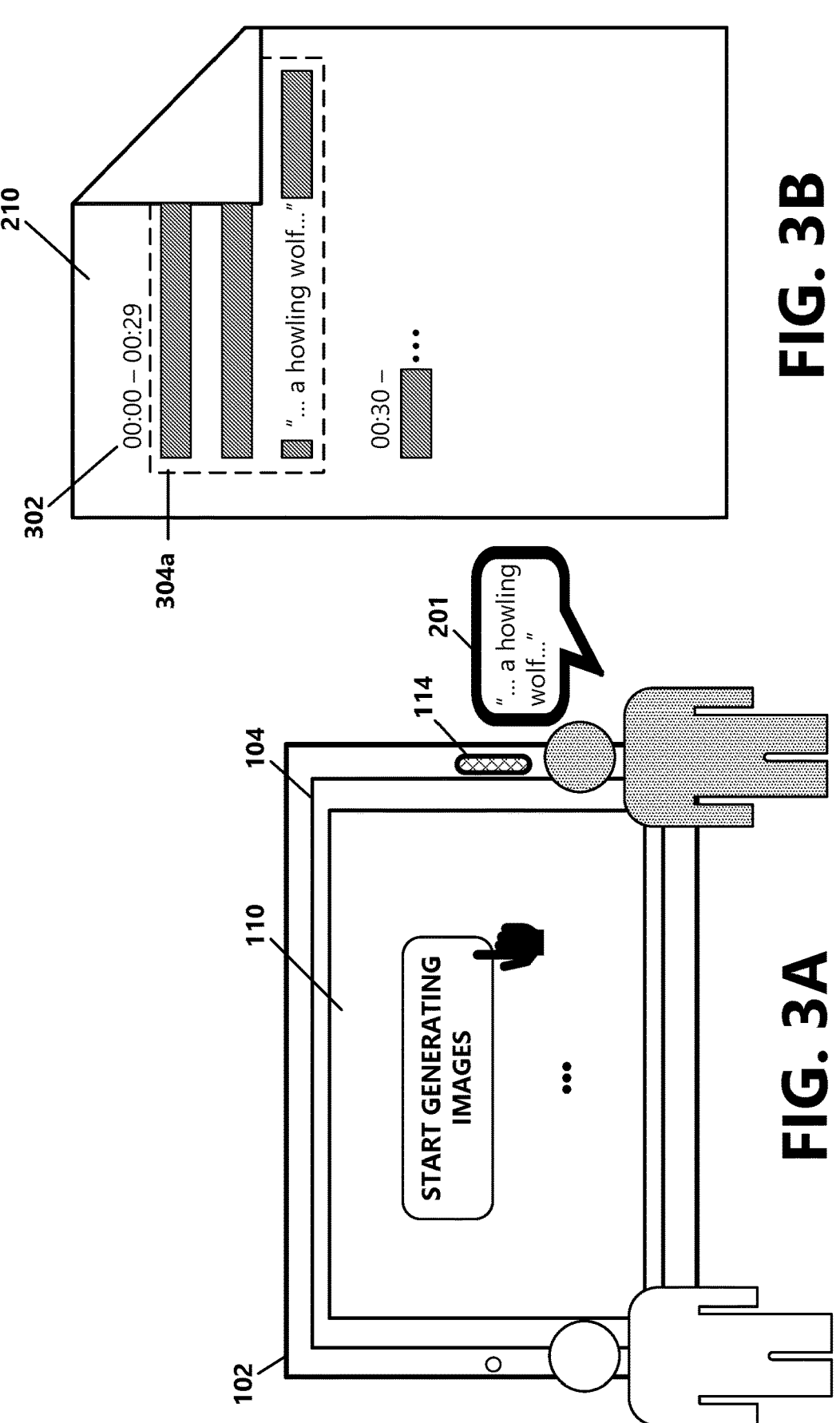
FIGS. 3A-3G are illustrations showing live image generation based on audio transcription according to an example.

FIGS. 3A-3F are illustrations showing live image generation based on audio transcription according to an example. With reference now to FIG. 3A, one or more users are using the image generator 110 operating on a computing device 102. According to an example, the user(s) start the image generator 110 and at least one user starts to speak. A live audio stream represented as audio input 201 is received by a microphone 114 on the computing device 102 and further received by the image generator 110. As depicted, the phrase, "a howling wolf" is included in the audio input 201.

With reference now to the example depicted in FIG. 3B, the image generator 110 generates a live text transcript 210 corresponding to the audio input 201. As shown, the image generator 110 further segments the live text transcript 210 into a first segment 304a including the uttered phrase, "a howling wolf". In one example, the image generator 110 segments the live text transcript 210 based on a timestamp 302. In another example, the image generator 110 determines segments based on a number of words or characters.

According to examples, the image generator 110 generates a first summarization-request LM prompt 215 including a request for a summarization of the first live text transcript segment 304a. The first summarization-request LM prompt 215 is provided to the LLM 108 and a summarization 230 generated by the LLM 108 is received in response. According to examples, the image generator 110 further generates a first image-request LM prompt 235 including a request for an image and the summarization 230. The first image-request LM prompt 235 is provided to the image-generation AI model 118 and a first image 222a generated by the image-generation AI model 118 is received in response. According to examples, the image generator 110 causes a display of the first image 222a on a display screen 104.

Figures 3C, 3D:
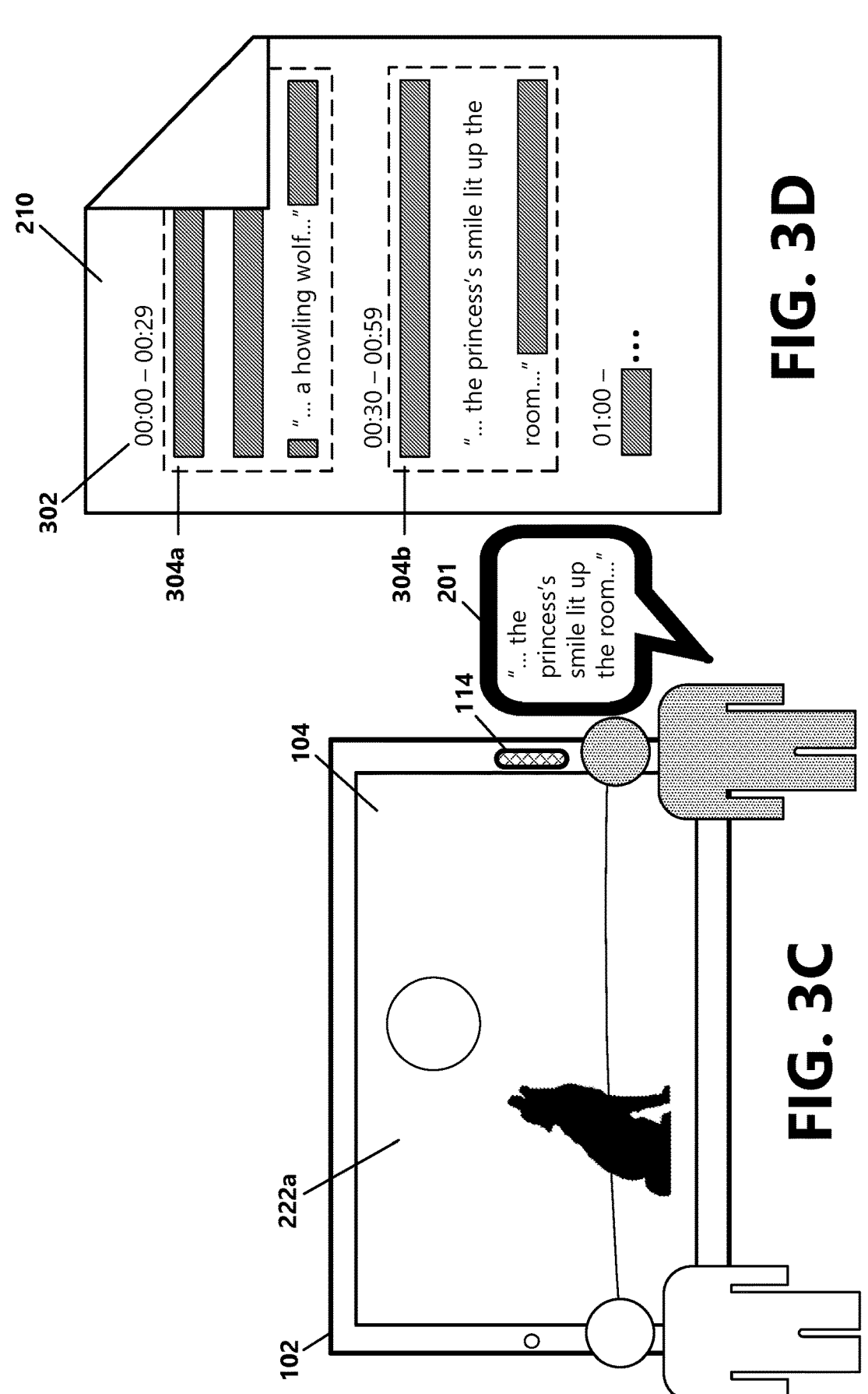

With reference now to FIG. 3C, the first image 222a is shown displayed on the display screen 104. As shown, the first image 222a is related to a detected topic of the first live text transcript segment 304a (e.g., a wolf that is howling at the moon). As further shown, at least one user is continuing to talk, and the live audio stream of the users' verbal communication continues to be received. For instance, audio input 201 including the phrase, "the princess's smile lit up the room" is received by the image generator 110.

As shown in FIG. 3D, the image generator 110 continues to generate the live text transcript 210 corresponding to the audio input 201. As shown, the image generator 110 further segments the live text transcript 210 into a second segment 304b including the uttered phrase, "the princess's smile lit up the room".

Figures 3E, 3F, 3G:
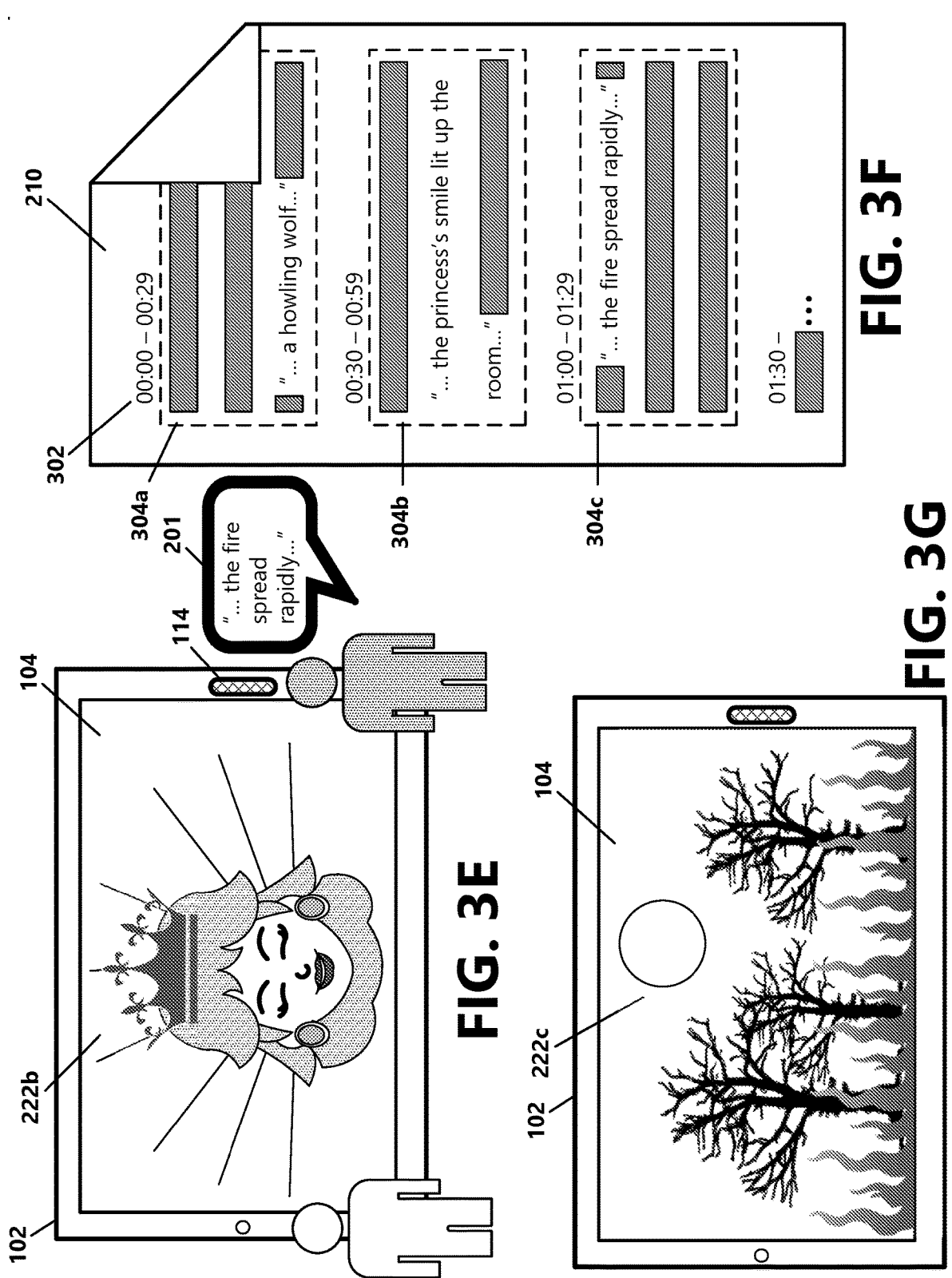

As depicted in FIG. 3E, a second image 222b is generated by the image generator 110 and is displayed on the display screen 104. In some examples, the second image 222b replaces the first image 222a. In other examples, the second image 222b is displayed concurrently with the first image 222a (e.g., side-by-side) and subsequent images may also be displayed to show an image-based time progression of topics discussed during the meeting, event, lecture, etc. As shown, the second image 222b is related to a detected topic of the second live text transcript segment 304b (e.g., a smiling princess). In some examples, a sentiment of the second live text transcript segment 304b is determined by the LLM 108, and an image corresponding to the determined sentiment is generated by the image-generation AI model 118. For instance, a topic about a princess whose smile lights up a room may have a positive and uplifting sentiment, conveying warmth, happiness, and enchantment. Thus, for example, the second image 222b may have a positive or uplifting tone. In some examples, the tone is different than a detected tone of the first live text transcript segment 304a. Thus, an updated image 222 (e.g., the second image 222b) may reflect a shift in mood or sentiment of the audio input 201. As further shown, the live audio stream of the users' verbal communication continues to be received. For instance, audio input 201 including the phrase, "the fire spread quickly" is received by the image generator 110.

As shown in FIG. 3F, the image generator 110 continues to generate the live text transcript 210 corresponding to the audio input 201. As shown, the image generator 110 further segments the live text transcript 210 into a third segment 304c including the uttered phrase, "the fire spread quickly". As depicted in FIG. 3G, a third image 222c is generated by the image generator 110 and is displayed on the display screen 104. According to an example, a topic of a quickly spreading fire may be determined to evoke negative or fearful sentiments due to the destructive nature of fires and the potential harm they can cause to people, animals, and property. Thus, the third image 222c may have a negative or dark tone. According to another example, the third live text transcript segment 304c may include additional details, where the topic focuses on a successful containment of the fire and the eventual restoration of affected areas. For instance, the third live text transcript segment 304c may be determined to elicit more positive emotions, such as relief and hope. Thus, the third image 222c may alternatively be generated with a hopeful tone.

FIG. 4 is a diagram illustrating an example method 400 of providing live image generation based on audio transcription. At operation 402, audio input 201 corresponding to a live audio stream of verbal communication is received. For instance, the audio input 201 is provided by one or more users and received by a microphone 114 of a computing device 102 in proximity to the user(s). According to examples, the computing device 102 further includes a display screen 104.

At operation 404, the audio stream is converted into a live text transcript 210. For instance, the image generator 110 uses speech-to-text conversion to generate the live text transcript 210 as the audio input 201 is received. According to some examples, the image generator 110 continues to perform operations 402-404 while also performing operations 406-424.

At operation 406, a first segment 304a of the live text transcript 210 is extracted. For instance, the image generator 110 determines the first segment 304a based on one or more factors, such as on a timestamp 302, a number of words, a number of characters, etc. In some implementations, the image generator 110 evaluates the first live text transcript segment 304a and determines whether the segment includes content for which an image 222 representative of the content is not appropriate to present (e.g., based on one or more guardrail settings). As an example, when the image generator 110 detects particular language corresponding to disallowed content, image generation is not triggered.

At operation 408, the image generator 110 generates summarization instructions for eliciting a desired summarization 230 from the LLM 108. In some examples, the image generator 110 includes, in the summarization instructions, one or a combination of text length instructions, element-of-interest instructions, sentiment instructions, guardrail instructions, and other instructions. As an example, text length instructions cause a generation of a summarization 230 of a desired text length. As another example, element-of-interest instructions cause a generation of a summarization 230 including a desired context, theme, and/or attribute. As a further example, sentiment instructions cause a generation of a summarization 230 that includes visually descriptive text that captures a detected mood or sentiment. As another example, guardrail instructions cause a generation of a summarization 230 that includes an indication of whether the first live text transcript segment 304a is associated with a child audience for providing an image 222 that is appropriate for a detected audience. As a further example, other instructions cause a generation of a summarization 230 that includes an identifier of a detected speaker of the first segment 304a or other desired information that can be detected by the LLM 108. In other examples, the summarization instructions include additional and/or alternative instructions.

At operation 410, the image generator 110 generates a first summarization-request LM prompt 215 including the summarization instructions and the first live text transcript segment 304a and sends the first summarization-request LM prompt 215 to the LLM 108 at operation 412. In response to the first summarization-request LM prompt 215, the image generator 110 receives the requested summarization 230 of the first live text transcript segment 304*a* at operation 414.

At operation 416, the image generator 110 generates image-generation priming instructions for eliciting a desired image 222 from the image-generation AI model 118. In some examples, the image generator 110 includes, in the image-generation priming instructions, one or more priming words that cause a generation of an image related to a specific context, theme, mood, desired image type (e.g., photo, drawing, painting, a stained-glass image), etc. In some examples, the image-generation priming instructions include guardrail instructions corresponding to allowing or disallowing certain image content or types of image content.

At operation 418, the image generator 110 generates a first image-request LM prompt 235 including the summarization 230 of the first live text transcript segment 304*a* and the image-generation priming instructions and sends the first image-request LM prompt 235 to the image-generation AI model 118 at operation 420. In response to the first image-request LM prompt 235, the image generator 110 receives a first image 222*a* at operation 422. For instance, the first image 222*a* is a visual representation of the first text transcript segment 304*a*.

At operation 424, the image generator 110 causes a display of the first image 222*a* on the display screen 104. For instance, a verbal communication of information is presented and a relevant visual of the information is presented in real time or near-real time. The method 400 returns to operation 406, where, as a live audio stream continues to be received (operation 402) and converted (operation 404) into the live text transcript 210, a second segment 304*b* of the live text transcript 210 is extracted. In some examples, the image generator 110 detects a speaker of the second segment 304*b* and compares the speaker to the detected speaker of the first segment 304*a* and either triggers image generation or not based on a detected change in speaker.

At operation 408, the image generator 110 generates summarization instructions to summarize the second live text transcript segment 304*b* and includes the generated summarization instructions and the second live text transcript segment 304*b* in a second summarization-request LM prompt 215 at operation 410. At operation 412, the image generator 110 sends the second summarization-request LM prompt 215 to the LLM 108 and receives the requested summarization 230 of the second live text transcript segment 304*b* at operation 414.

In some examples, prior to generating the image-generation priming instructions for a second image-request LM prompt 235, the image generator 110 determines whether a topic of the second live text transcript segment 304*b* has changed from a topic of the first live text transcript segment 304*a*. For instance, when the topic is determined to be different by a dissimilarity threshold or below a similarity threshold, the image generator 110 triggers image generation (e.g., querying the image-generation AI model 118 for an image 222). In further examples, prior to generating the image-generation priming instructions for the second image-request LM prompt 235, the image generator 110 detects a sentiment of the second live text transcript segment 304*b* and adjusts the image-generation priming instructions for the second image-request LM prompt 235 based on the detected sentiment. In some examples, the image generator 110 includes a request for the sentiment of a live text transcript segment 304 in the first LM prompt 215.

At operation 416, the image generator 110 generates image-generation priming instructions requesting generation of an image 222 of the summarization 230 of the second live text transcript segment 304*b* and includes the image-generation priming instructions and the second summarization 230 in the second image-request LM prompt 235 at operation 418. The second image-request LM prompt 235 is provided to the image-generation AI model 118 at operation 420, and a second image 222*b* is received at operation 422 in response to the second image-request LM prompt 235. For instance, the first image 222*b* is a visual representation of the second text transcript segment 304*b*.

At operation 424, the image generator 110 causes a display of the second image 222*b* on the display screen 104. In some examples, the second image 222*b* replaces the first image 222*a*. In other examples, the second image 222*b* is displayed concurrently with the first image 222*a*. In some examples, the second image 222*b* has a different sentiment than the first image 222*a*. For instance, the topic and sentiment of the verbal communication is presented visually in real time or near-real time, which can enhance the effectiveness of the verbal communication. As an example, the second image 222*b* conveys an emotion or mood that is different than an emotion or mood conveyed in the first image 222*a*, which can provide visual indicators and feedback to the speaker. The speaker can use the visual indicators and feedback to either maintain the current emotion/mood of their verbal communication or, if the emotion/mood of the second image 222*b* is moving in a direction the speaker does not want, adjust the sentiment of their communication. The method 400 returns to operation 406, where images 222 may continue to be generated and displayed as the live audio stream continues to be received (operation 402) and converted (operation 404) into the live text transcript 210.

FIG. 5 is a block diagram illustrating physical components (e.g., hardware) of a computing device 500 with which examples of the present disclosure may be practiced. The computing device components described below may be suitable for one or more of the components of the system 100 described above. In a basic configuration, the computing device 500 includes at least one processing unit 502 and a system memory 504. Depending on the configuration and type of computing device 500, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550 (e.g., the image generator 110) and other applications 112.

The operating system 505 may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules

506 may perform processes including one or more of the stages of the methods 400 illustrated in FIG. 4. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 500 on the single integrated circuit (chip). Examples of the present disclosure may also be practiced using other technologies capable of performing logical operations such as, for example, AND, OR, and NOT, including mechanical, optical, fluidic, and quantum technologies.

The computing device 500 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer readable media may be part of the computing device 500. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, a system is provided for live image generation based on audio transcription, comprising: a processing system; and memory storing instructions that, when executed by the processor, cause the system to: convert a live audio stream into a live text transcript using speech-to-text conversion; extract a first segment of the live text transcript; generate a first language model (LM) prompt including the extracted first segment and summarization instructions to summarize the extracted first segment; provide the first LM prompt to an LM; receive, from the LM, a summarization of the first segment; generate a second LM prompt including the summarization of the first segment and an image-generation priming instruction; provide the second LM prompt to an image-generation AI model; receive, from the image-generation AI model, a first image based on the second LM prompt; and cause a display of the first image on a display screen.

In an example, the instructions further cause the system to capture the live audio stream with one or more microphones positioned in a room, wherein the display screen is positioned in the room. In another example, the summarization instructions include a text length limitation for the summarization. In a further example, the summarization instructions include at least one of allow and disallow instructions for the summarization. In yet a further example, the image-generation priming instruction includes guardrail instructions that define allowed or disallowed image content. In yet another further example, the first LM prompt further includes a sentiment request for the extracted first segment; and a response to the first LM prompt from the LM includes a sentiment of the first segment. In still yet another example, the instructions further cause the system to include the sentiment in the second LM prompt. In a further example, the sentiment is included in the image-generation priming instruction. In yet another further example, the sentiment is included in the summarization.

In another example, a third LM prompt includes a sentiment request for a second segment; a response to the third LM prompt from the LM includes a sentiment of the second segment; and the instructions further cause the system to adjust or select the image-generation priming instruction for a fourth LM prompt based on the sentiment of the second segment. In yet another example, the instructions further cause the system to: capture additional audio of the live audio stream; update the live text transcript with text converted from the additional audio; while the first image is being displayed, extract the second segment of the updated live text transcript; generate the third LM prompt including the extracted second segment and the summarization instructions; provide the third LM prompt to the LM; receive, from the LM, an output including a summarization of the second segment; generate the fourth LM prompt including the summarization of the second segment and the image-generation priming instruction; provide the fourth LM prompt to the image-generation AI model; receive, from the image-generation AI model, a second image based on the fourth LM prompt; and cause a display of the second image on the display screen. In still yet another example, in causing the display of the second image, the instructions cause the system to replace the first image with the second image. In a further example, in causing the display of the second image, the instructions cause the system to display the second image concurrently with the first image. In another further example, the first image conveys a first mood of a sentiment detected of the first segment; and the second image conveys a second mood of the sentiment of the second segment and feedback to a user of a change in mood.

In another aspect, a computer-implemented method is provided for live image generation based on audio transcription, the method comprising: converting a live audio stream into a live text transcript using speech-to-text conversion; determining a first segment of the live text transcript; generating summarization instructions to summarize the first segment; including the first segment and the summarization instructions in a summarization-request language model (LM) prompt; providing the summarization-request LM prompt to a large LM (LLM); receiving, from the LLM, a summarization of the first segment; generating an image-generation priming instruction to generate an image representing the summarization of the first segment; including the summarization of the first segment and the image-generation priming instruction in an image-request LM prompt; providing the image-request LM prompt to an image-generation AI model; receiving, from the image-generation AI model, a first image representing the summarization of the first segment based on the image-request LM prompt; and displaying the first image on a display screen.

In an example, generating the summarization instructions includes at least one of: generating text length instructions for a desired length of the summarization; generating allow instructions for allowed content in the summarization; and generating disallow instructions for disallowed content in the summarization. In another example, generating the image-generation priming instruction includes generating guardrail instructions defining allowed or disallowed image content. In a further example, including the first segment and the summarization instructions in the summarization-request LM prompt further includes: including a sentiment request for the first segment; receiving, from the LM, a sentiment of the first segment; and including the sentiment in the image-request LM prompt. In yet a further example, the method further comprises: capturing additional audio of the live audio stream; updating the live text transcript with text converted from the additional audio; while the first image is being displayed, extracting a second segment of the updated live text transcript; generating a second summarization-request LM prompt including the extracted second segment and the summarization instructions, the summarization instructions including a sentiment request for the second segment; providing the second summarization-request LM prompt to the LM; receiving, from the LM, an output including a summarization of the second segment and a sentiment of the second segment; generating a second image-request LM prompt including the summarization of the second segment, the image-generation priming instruction, the image-generation priming instruction including the sentiment of the second segment; providing the second image-request LM prompt to the image-generation AI model; receiving, from the image-generation AI model, a second image based on the second image-request LM prompt; and causing a display of the second image on the display screen.

In another aspect, a computer-implemented method is provided, comprising: converting a live audio stream into a live text transcript using speech-to-text conversion; determining a first segment of the live text transcript; generating a first summarization-request language model (LM) prompt including the first segment, summarization instructions to summarize the first segment, and a sentiment request for the first segment; providing the first summarization-request LM prompt to a large LM (LLM); receiving, from the LLM, a summarization and sentiment of the first segment; generating a first image-request LM prompt including the summarization and sentiment of the first segment and an image-generation priming instruction to generate an image representing the summarization and sentiment of the first segment; providing the first image-request LM prompt to an image-generation AI model; receiving, from the image-generation AI model, a first image representing the summarization of the first segment based on the first image-request LM prompt; displaying the first image on a display screen; capturing additional audio of the live audio stream; updating the live text transcript with text converted from the additional audio; while the first image is being displayed, extracting a second segment of the updated live text transcript; generating a second summarization-request LM prompt including the second segment, summarization instructions to summarize the second segment, and a sentiment request for the second segment; providing the second summarization-request LM prompt to the LLM; receiving, from the LLM, a summarization and sentiment of the second segment; generating a second image-request LM prompt including the summarization and sentiment of the second segment and an image-generation priming instruction to generate an image representing the summarization and sentiment of the second segment; providing the second image-request LM prompt to the image-generation AI model; receiving, from the image-generation AI model, a second image representing the summarization of the second segment based on the second image-request LM prompt; and replacing the first image with the second image on the display screen.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for live image generation based on audio transcription, the system comprising:
at least one processor; and
memory storing instructions that when executed by the at least one processor cause the system to:
convert a live audio stream into a live text transcript using speech-to-text conversion;
extract a first segment of the live text transcript;
generate a first language model (LM) prompt including the extracted first segment and summarization instructions to summarize the extracted first segment;
provide the first LM prompt to an LM;
receive, from the LM, a text summarization of the first segment;

generate a second LM prompt including the text summarization of the first segment and an image-generation priming instruction;
provide the second LM prompt to an image-generation AI model to cause the image generation AI model to generate a unique first image based on the text summarization in the second LM prompt, wherein the image-generation AI model is different from the LM;
receive, from the image-generation AI model, a first image based on the second LM prompt; and
cause a display of the first image on a display screen.

2. The system of claim 1, wherein the instructions further cause the system to capture the live audio stream with one or more microphones positioned in a room, wherein the display screen is positioned in the room.

3. The system of claim 1, wherein the summarization instructions include a text length limitation for the summarization.

4. The system of claim 1, wherein the summarization instructions include at least one of allow and disallow instructions for the summarization.

5. The system of claim 1, wherein the image-generation priming instruction includes guardrail instructions that define allowed or disallowed image content.

6. The system of claim 1, wherein:
the first LM prompt further includes a sentiment request for the extracted first segment; and
a response to the first LM prompt from the LM includes a sentiment of the first segment.

7. The system of claim 6, wherein the instructions further cause the system to include the sentiment in the second LM prompt.

8. The system of claim 7, wherein the sentiment is included in the image-generation priming instruction.

9. The system of claim 7, wherein the sentiment is included in the summarization.

10. The system of claim 1, wherein:
a third LM prompt includes a sentiment request for a second segment;
a response to the third LM prompt from the LM includes a sentiment of the second segment; and
the instructions further cause the system to adjust or select the image-generation priming instruction for a fourth LM prompt based on the sentiment of the second segment.

11. The system of claim 10, wherein the instructions further cause the system to:
capture additional audio of the live audio stream;
update the live text transcript with text converted from the additional audio;
while the first image is being displayed, extract the second segment of the updated live text transcript;
generate the third LM prompt including the extracted second segment and the summarization instructions;
provide the third LM prompt to the LM;
receive, from the LM, an output including a summarization of the second segment;
generate the fourth LM prompt including the summarization of the second segment and the image-generation priming instruction;
provide the fourth LM prompt to the image-generation AI model;
receive, from the image-generation AI model, a second image based on the fourth LM prompt; and
cause a display of the second image on the display screen.

12. The system of claim 10, wherein in causing the display of the second image, the instructions cause the system to replace the first image with the second image.

13. The system of claim 10, wherein in causing the display of the second image, the instructions cause the system to display the second image concurrently with the first image.

14. The system of claim 10, wherein:

the first image conveys a first mood of a sentiment detected of the first segment; and the second image conveys a second mood of the sentiment of the second segment and feedback to a user of a change in mood.

15. A method for live image generation based on audio transcription, the method comprising:

converting a live audio stream into a live text transcript using speech-to-text conversion;

determining a first segment of the live text transcript;

generating summarization instructions to summarize the first segment;

including the first segment and the summarization instructions in a summarization-request language model (LM) prompt;

providing the summarization-request LM prompt to a large LM (LLM);

receiving, from the LLM, a text summarization of the first segment;

generating an image-generation priming instruction to generate an image representing the summarization of the first segment;

including the text summarization of the first segment and the image-generation priming instruction in an image-request LM prompt;

providing the image-request LM prompt to an image-generation AI model to cause the image-generation AI model to generate a unique first image based on the text summarization in the second LM prompt, wherein the image-generation AI model is different from the LLM;

receiving, from the image-generation AI model, the first image representing the summarization of the first segment based on the image-request LM prompt; and displaying the first image on a display screen.

16. The method of claim 15, wherein generating the summarization instructions includes at least one of:

generating text length instructions for a desired length of the summarization;

generating allow instructions for allowed content in the summarization; and generating disallow instructions for disallowed content in the summarization.

17. The method of claim 15, wherein generating the image-generation priming instruction includes generating guardrail instructions defining allowed or disallowed image content.

18. The method of claim 15, wherein including the first segment and the summarization instructions in the summarization-request LM prompt further includes:

including a sentiment request for the first segment;

receiving, from the LM, a sentiment of the first segment; and including the sentiment in the image-request LM prompt.

19. The method of claim 18, further comprising:

capturing additional audio of the live audio stream;

updating the live text transcript with text converted from the additional audio;

while the first image is being displayed, extracting a second segment of the updated live text transcript;

generating a second summarization-request LM prompt including the extracted second segment and the summarization instructions, the summarization instructions including a sentiment request for the second segment;

providing the second summarization-request LM prompt to the LM;

receiving, from the LM, an output including a summarization of the second segment and a sentiment of the second segment;

generating a second image-request LM prompt including the summarization of the second segment, the image-generation priming instruction, the image-generation priming instruction including the sentiment of the second segment;

providing the second image-request LM prompt to the image-generation AI model;

receiving, from the image-generation AI model, a second image based on the second image-request LM prompt; and causing a display of the second image on the display screen.

20. A computer-implemented method, comprising:

converting a live audio stream into a live text transcript using speech-to-text conversion;

determining a first segment of the live text transcript;

generating a first summarization-request language model (LM) prompt including the first segment, summarization instructions to summarize the first segment, and a sentiment request for the first segment;

providing the first summarization-request LM prompt to a large LM (LLM);

receiving, from the LLM, a summarization and sentiment of the first segment;

generating a first image-request LM prompt including the summarization and sentiment of the first segment and an image-generation priming instruction to generate an image representing the summarization and sentiment of the first segment;

providing the first image-request LM prompt to an image-generation AI model;

receiving, from the image-generation AI model, a first image representing the summarization of the first segment based on the first image-request LM prompt;

displaying the first image on a display screen;

capturing additional audio of the live audio stream;

updating the live text transcript with text converted from the additional audio;

while the first image is being displayed, extracting a second segment of the updated live text transcript;

generating a second summarization-request LM prompt including the second segment, summarization instructions to summarize the second segment, and a sentiment request for the second segment;

providing the second summarization-request LM prompt to the LLM;

receiving, from the LLM, a summarization and sentiment of the second segment;

generating a second image-request LM prompt including the summarization and sentiment of the second segment and an image-generation priming instruction to generate an image representing the summarization and sentiment of the second segment;

providing the second image-request LM prompt to the image-generation AI model;

23 24 receiving, from the image-generation AI model, a second
image representing the summarization of the second
segment based on the second image-request LM
prompt; and
replacing the first image with the second image on the 5
display screen.

\* \* \* \* \*